(12) United States Patent
Iwasaki

(10) Patent No.: US 12,054,920 B2
(45) Date of Patent: Aug. 6, 2024

(54) CONTROL SYSTEM FOR CONSTRUCTION MACHINE, CONSTRUCTION MACHINE, AND CONTROL METHOD FOR CONSTRUCTION MACHINE

(71) Applicant: Komatsu Ltd., Tokyo (JP)

(72) Inventor: Yoshiro Iwasaki, Tokyo (JP)

(73) Assignee: Komatsu Ltd., Tokyo (JP)

( * ) Notice: Subject to any disclaimer, the term of this patent is extended or adjusted under 35 U.S.C. 154(b) by 457 days.

(21) Appl. No.: 17/426,677

(22) PCT Filed: Dec. 19, 2019

(86) PCT No.: PCT/JP2019/049874
§ 371 (c)(1),
(2) Date: Jul. 29, 2021

(87) PCT Pub. No.: WO2020/158235
PCT Pub. Date: Aug. 6, 2020

(65) Prior Publication Data
US 2022/0106773 A1   Apr. 7, 2022

(30) Foreign Application Priority Data
Feb. 1, 2019   (JP) .................................. 2019-017393

(51) Int. Cl.
*E02F 9/26* (2006.01)
*E02F 3/32* (2006.01)
(Continued)

(52) U.S. Cl.
CPC .............. *E02F 9/262* (2013.01); *E02F 3/435* (2013.01); *E02F 9/123* (2013.01); *E02F 9/265* (2013.01);
(Continued)

(58) Field of Classification Search
CPC . E02F 9/262; E02F 3/435; E02F 9/123; E02F 9/265; E02F 3/32; E02F 9/2228; E02F 3/43; G05B 13/04
See application file for complete search history.

(56) References Cited

U.S. PATENT DOCUMENTS 9,464,406 B2   10/2016  Matsuyama et al.
11,015,319 B2   5/2021  Izumikawa
(Continued)

FOREIGN PATENT DOCUMENTS

| KR | 20170131484 A | 11/2017 |
|----|---------------|---------|
| KR | 20180135939 A | 12/2018 |

(Continued)

*Primary Examiner* — Dale W Hilgendorf
(74) *Attorney, Agent, or Firm* — Locke Lord LLP

(57) ABSTRACT

A control method for a construction machine includes: generating a target value of an amount of control of each of a tilt bucket and a swing body, based on operation data obtained when working equipment and the swing body are operated and a design surface indicating a target shape of a construction target; calculating a predicted value of the amount of control of each of the tilt bucket and the swing body, based on the target values and a prediction model for the construction machine; calculating amounts of drive to control the working equipment and the swing body, based on the predicted values and the design surface to maintain a distance from the tilt bucket to the design surface and an attitude of the tilt bucket; and outputting control commands to control the working equipment and the swing body based on the amounts of drive.

8 Claims, 11 Drawing Sheets

(51) Int. Cl.
*E02F 3/43* (2006.01)
*E02F 9/12* (2006.01)
*E02F 9/22* (2006.01)
*G05B 13/04* (2006.01)

(52) U.S. Cl.
CPC .............. *G05B 13/04* (2013.01); *E02F 3/32* (2013.01); *E02F 9/2228* (2013.01)

(56) References Cited

U.S. PATENT DOCUMENTS

| | | | | |
|---|---|---|---|---|
| 2009/0083206 | A1* | 3/2009 | Shigemori | G06Q 50/04 |
| | | | | 706/46 |
| 2014/0099178 | A1* | 4/2014 | Nomura | E02F 9/26 |
| | | | | 414/685 |
| 2016/0097184 | A1* | 4/2016 | Matsuyama | E02F 9/2033 |
| | | | | 701/50 |
| 2016/0244950 | A1* | 8/2016 | Kami | E02F 9/262 |
| 2016/0251835 | A1* | 9/2016 | Kitajima | E02F 9/262 |
| | | | | 701/50 |
| 2016/0321763 | A1* | 11/2016 | Shike | G06Q 50/08 |
| 2017/0130428 | A1* | 5/2017 | Matsuzaki | E02F 9/2246 |
| 2017/0342679 | A1* | 11/2017 | Iwamura | E02F 9/262 |
| 2018/0002900 | A1* | 1/2018 | Morimoto | E02F 9/261 |
| 2018/0016768 | A1 | 1/2018 | Izumikawa | |
| 2018/0016771 | A1* | 1/2018 | Izumikawa | E02F 9/264 |
| 2019/0017248 | A1* | 1/2019 | Okada | E02F 9/20 |
| 2019/0127946 | A1* | 5/2019 | Sakai | E02F 9/2203 |
| 2019/0292747 | A1* | 9/2019 | Takehara | E02F 9/262 |
| 2020/0011029 | A1* | 1/2020 | Sano | E02F 9/2029 |

FOREIGN PATENT DOCUMENTS

| | | |
|---|---|---|
| WO | 2014/167718 A1 | 10/2014 |
| WO | 2016/158779 A1 | 10/2016 |
| WO | 2018/030220 A1 | 2/2018 |

* cited by examiner

CONTROL SYSTEM FOR CONSTRUCTION MACHINE, CONSTRUCTION MACHINE, AND CONTROL METHOD FOR CONSTRUCTION MACHINE

FIELD

The present invention relates to a control system for a construction machine, the construction machine, and a control method for the construction machine.

BACKGROUND

In a technical field related to construction machines, there is known a control system for a construction machine that moves a bucket of working equipment along a design surface that indicates a target shape of a construction target, as disclosed in Patent Literature 1.

CITATION LIST

Patent Literature

Patent Literature 1: WO 2014/167718 A

SUMMARY

Technical Problem

The construction machine has a swing body. The working equipment is supported by the swing body. In some cases, the construction machine has a tilt bucket that is capable of tilt rotation. The construction machine is configured to form a slope on the construction target only by operating the working equipment so that the tilt bucket approaches the swing body. In some cases, when forming the slope on the construction target by the tilt bucket, the working equipment is operated while swinging the swing body so as to prevent the tilt bucket from digging below the design surface. When the swing body swings on the basis of operation of an operation device by a driver, if the swing body has a high swing speed, the tilt bucket may dig below the design surface, preventing excavation of the construction target into a desired shape.

An object of an aspect of the present invention is to excavate a construction target into a desired shape.

Solution to Problem

According to an aspect of the present invention, a control system for a construction machine including working equipment that includes an arm and a tilt bucket, and a swing body supporting the working equipment, the control system comprises: a design surface acquisition unit configured to acquire a design surface indicating a target shape of a construction target; an operation data acquisition unit configured to acquire operation data of an operation device operating the working equipment and the swing body; a target value generation unit configured to generate a target value of an amount of control relating to tilt rotation of the tilt bucket and a target value of an amount of control of the swing body, based on the operation data obtained when the working equipment and the swing body are operated and the design surface; a prediction unit configured to calculate a predicted value of the amount of control relating to the tilt rotation of the tilt bucket and a predicted value of an amount of control relating to swing of the swing body, based on the target values and a prediction model for the construction machine, and configured to calculate amounts of drive to control the working equipment and the swing body, based on the predicted values and the design surface so as to maintain a distance from a predetermined portion of the tilt bucket to the design surface and an attitude of the tilt bucket; and a command unit configured to output control commands to control the working equipment and the swing body based on the amounts of drive.

Advantageous Effects of Invention

According to the aspect of the present invention, the construction target can be excavated into the desired shape.

DESCRIPTION OF EMBODIMENTS

Embodiments according to the present invention will be described below with reference to the drawings, but the present invention is not limited to this description. Component elements according to the embodiments described below can be appropriately combined with each other. Furthermore, in some cases, some of the component elements are not used.

In the following description, a three-dimensional vehicle body coordinate system (X, Y, Z) is defined, and a positional relationship between respective component elements will be described. The vehicle body coordinate system represents a coordinate system that has the origin fixed to a construction machine. The vehicle body coordinate system is defined by an X-axis that extends in a defined direction based on the origin set to the construction machine, a Y-axis that is orthogonal to the X-axis, and a Z-axis that is orthogonal to each of the X-axis and the Y-axis. A direction parallel to the X-axis is an X-axis direction. A direction parallel to the Y-axis is a Y-axis direction. A direction parallel to the Z-axis is a Z-axis direction. A rotation or tilting direction about the X-axis is a θX direction. A rotation or tilting direction about the Y-axis is a θY direction. A rotation or tilting direction about the Z-axis is a θZ direction.

[Construction Machine]

Figure 1:
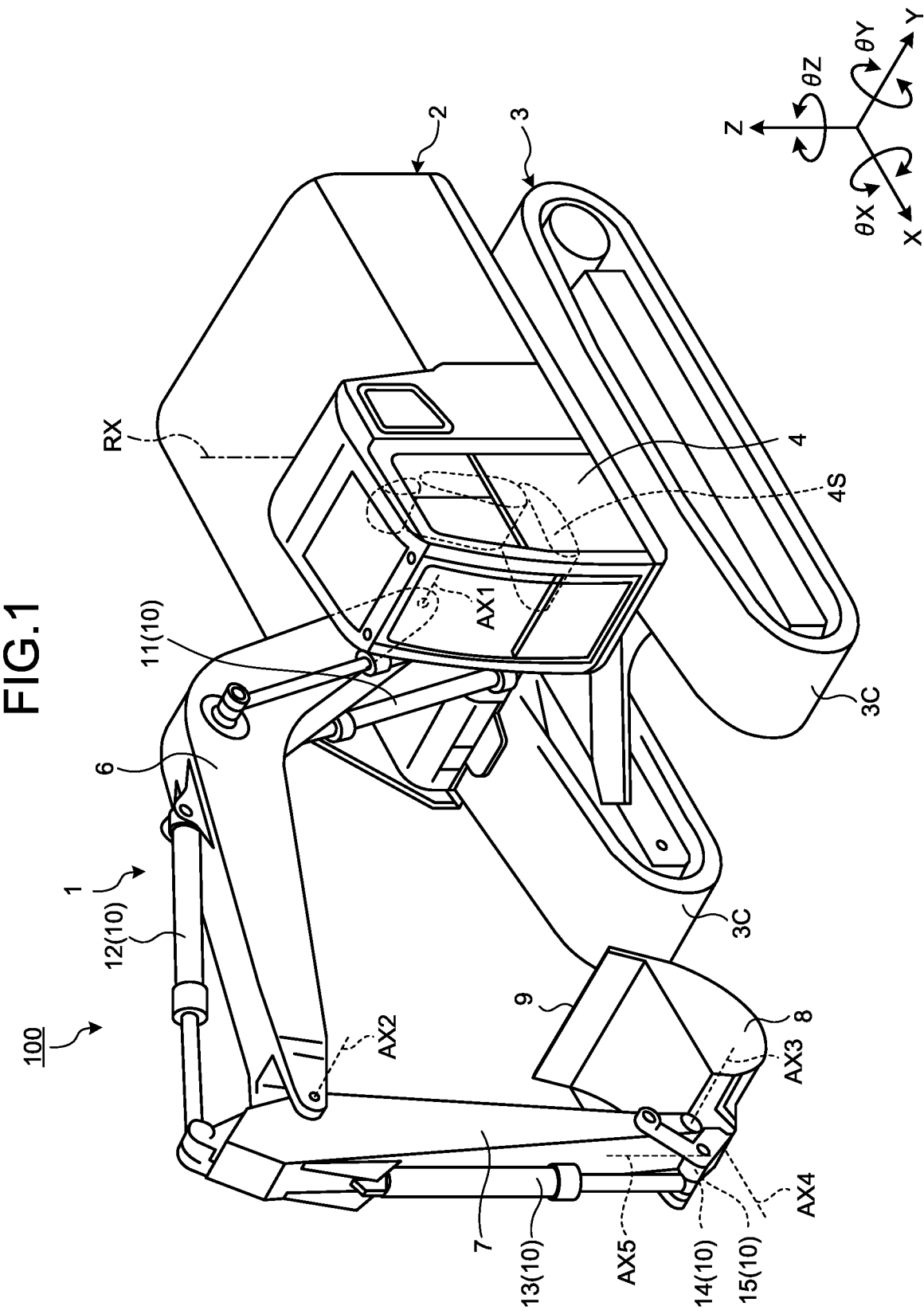
FIG. 1 is a perspective view illustrating an example of a construction machine according to the present embodiment.

FIG. 1 is a perspective view illustrating an example of a construction machine 100 according to the present embodiment. In the present embodiment, an example of the construction machine 100 as an excavator will be described. In the following description, the construction machine 100 is appropriately referred to as the excavator 100.

As illustrated in FIG. 1, the excavator 100 includes working equipment 1 that is operated by hydraulic pressure, a swing body 2 that is configured to support the working equipment 1, and a traveling body 3 that is configured to support the swing body 2. The swing body 2 has a cab 4 which a driver gets into. In the cab 4, a seat 4S on which the driver is seated is arranged. The swing body 2 is swingable about a swing axis RX with the swing body 2 supported by the traveling body 3.

The traveling body 3 has a pair of tracks 3C. The excavator 100 travels by the rotation of the tracks 3C. Note that the traveling body 3 may have tires.

The working equipment 1 is supported by the swing body 2. The working equipment 1 has a boom 6 that is connected to the swing body 2, an arm 7 that is connected to a distal end of the boom 6, and a bucket 8 that is connected to a distal end of the arm 7. The bucket 8 has a blade edge 9. In the present embodiment, the blade edge 9 of the bucket 8 is the edge of a straight blade. The blade edge 9 of the bucket 8 may be the tip of a protruded tooth provided at the bucket 8.

The boom 6 is rotatable about a boom axis AX1 relative to the swing body 2. The arm 7 is rotatable about an arm axis AX2 relative to the boom 6. In the present embodiment, the bucket 8 is a tilt bucket. The bucket 8 is rotatable relative to the arm 7 about each of a bucket axis AX3, a tilt axis AX4, and a rotating axis AX5. The boom axis AX1, arm axis AX2, and bucket axis AX3 are parallel to the Y-axis. The tilt axis AX4 is orthogonal to the bucket axis AX3. The rotating axis AX5 is orthogonal to each of the bucket axis AX3 and the tilt axis AX4. The swing axis RX is parallel to the Z-axis. The X-axis direction is a front-rear direction of the swing body 2. The Y-axis direction is a vehicle width direction of the swing body 2. The Z-axis direction is a vertical direction of the swing body 2. A direction of the working equipment 1 relative to the driver seated on the seat 4S is a front direction.

Figure 2:
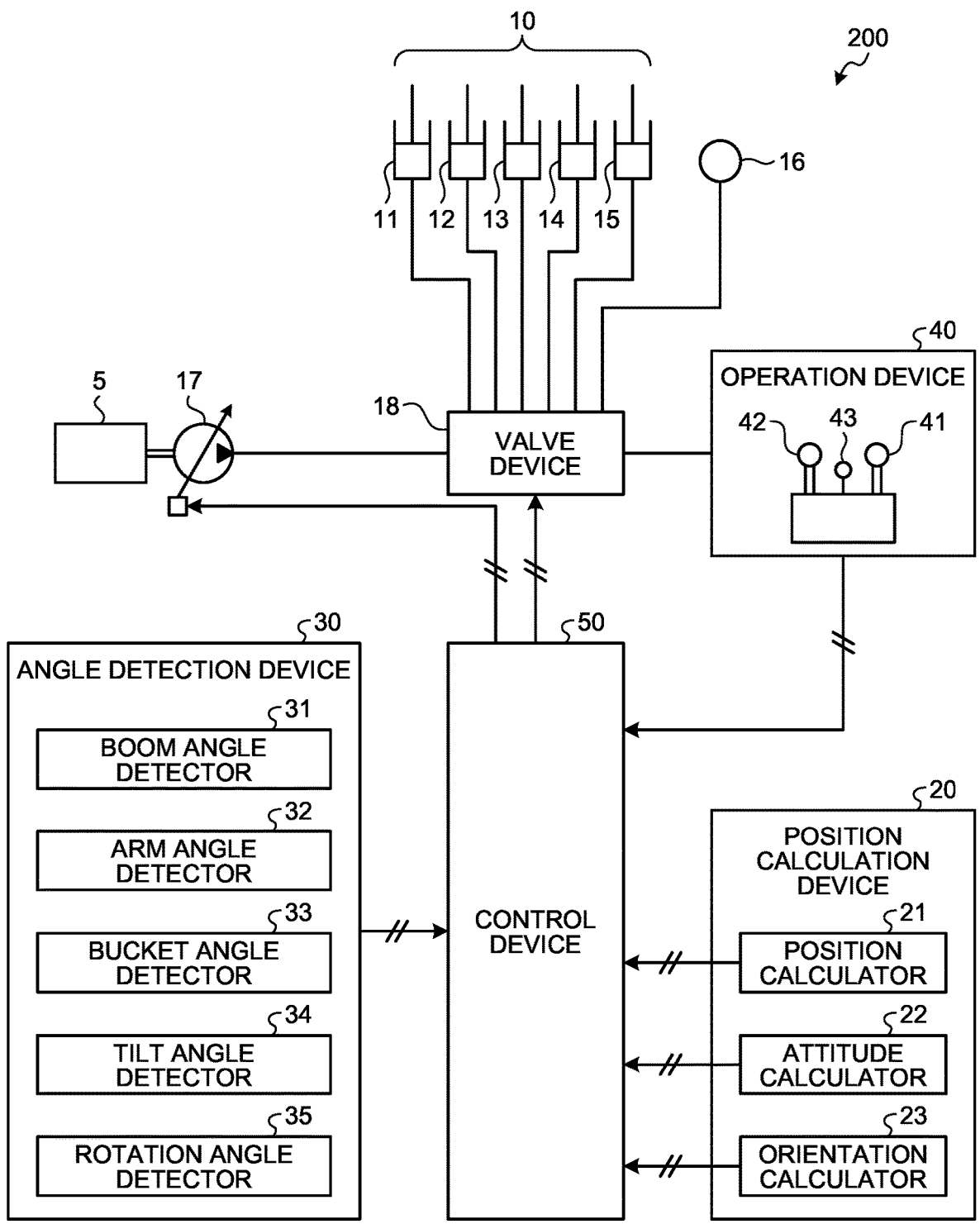
FIG. 2 is a block diagram illustrating a control system for the construction machine according to the present embodiment.
Figure 3A:
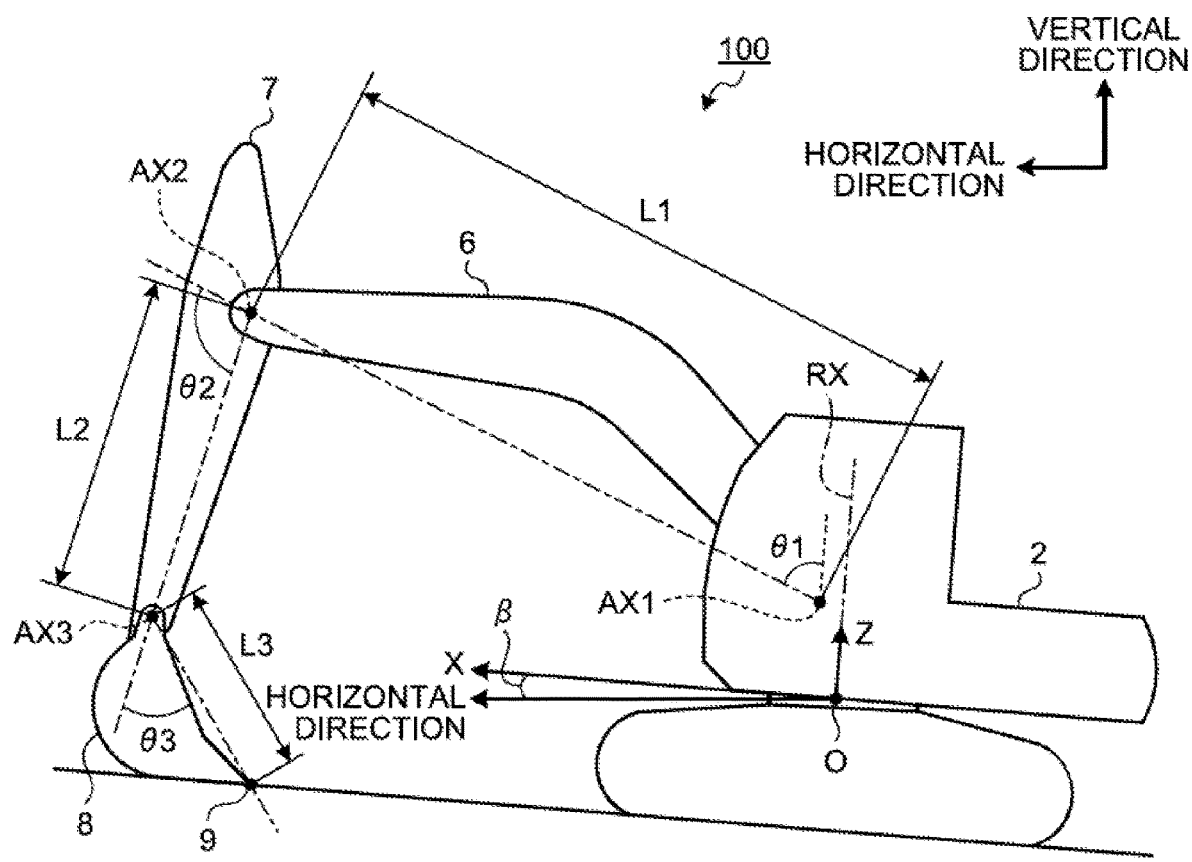
FIG. 3 is a diagram schematically illustrating the construction machine according to the present embodiment (FIGS. 3A thru 3C are multiple views of the diagram).
Figure 3B:
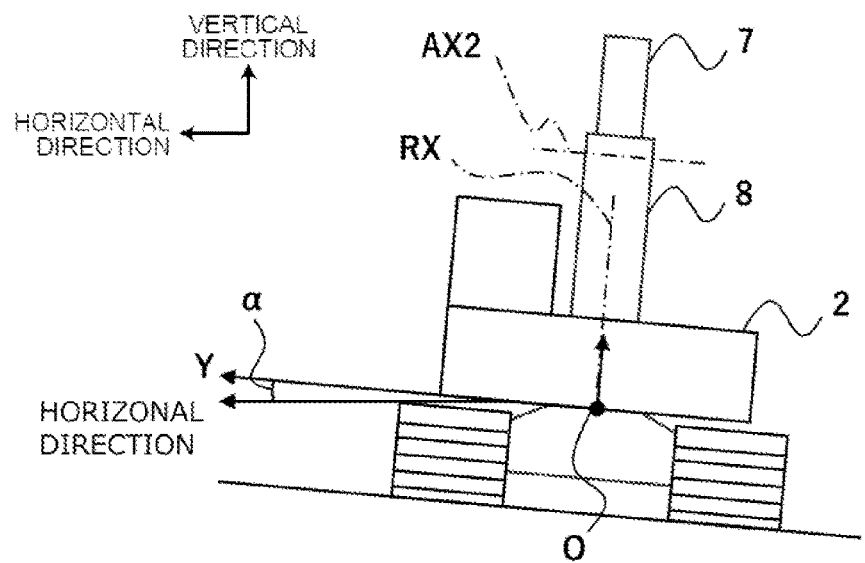
Figure 3C:
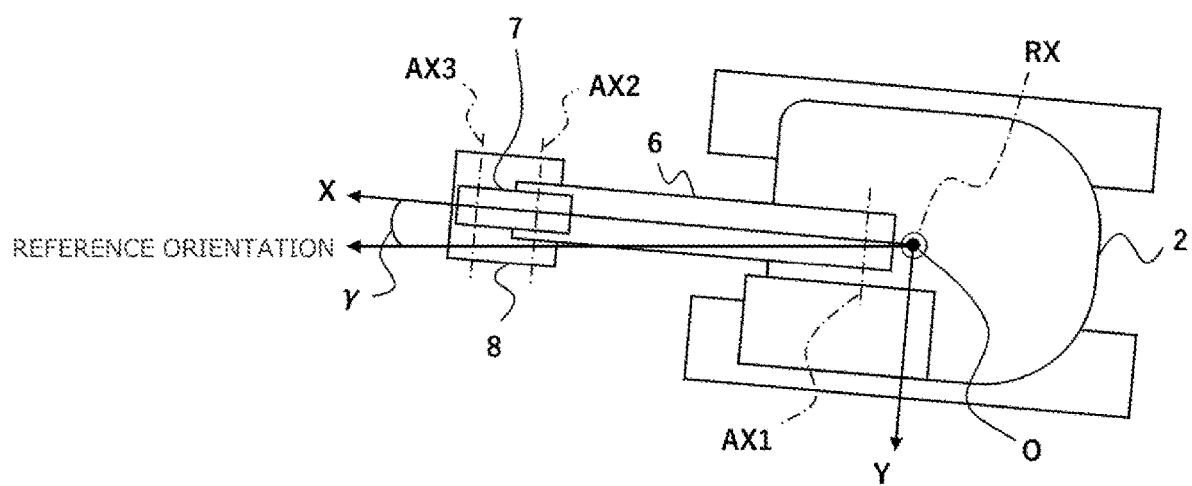

FIG. 2 is a block diagram illustrating a control system 200 for the excavator 100 according to the present embodiment. FIG. 3 is a diagram schematically illustrating the excavator 100 according to the present embodiment. FIG. 4(A) and FIG. 4(B) are diagrams schematically illustrating the bucket 8 according to the present embodiment.

As illustrated in FIG. 2, the control system 200 for the excavator 100 includes an engine 5, a plurality of hydraulic cylinders 10 configured to drive the working equipment 1, a swing motor 16 configured to drive the swing body 2, a hydraulic pump 17 configured to discharge hydraulic oil, a valve device 18 configured to distribute the hydraulic oil discharged from the hydraulic pump 17 to each of the plurality of hydraulic cylinders 10 and the swing motor 16, a position calculation device 20 configured to calculate positional data of the swing body 2, an angle detection device 30 configured to detect angles θ of the working equipment 1, an operation device 40 configured to operate the working equipment 1 and the swing body 2, and a control device 50.

The working equipment 1 is operated by power generated by the hydraulic cylinders 10. Each of the hydraulic cylinders 10 is driven on the basis of the hydraulic oil supplied from the hydraulic pump 17. The hydraulic cylinder 10 includes a boom cylinder 11 that is configured to operate the boom 6, an arm cylinder 12 that is configured to operate the arm 7, and a bucket cylinder 13, a tilt cylinder 14, and a rotating cylinder 15 that are configured to operate the bucket 8. The boom cylinder 11 generates power to rotate the boom 6 about the boom axis AX1. The arm cylinder 12 generates power to rotate the arm 7 about the arm axis AX2. The bucket cylinder 13 generates power to rotate the bucket 8 about the bucket axis AX3. The tilt cylinder 14 generates power to rotate the bucket 8 about the tilt axis AX4. The rotating cylinder 15 generates power to rotate the bucket 8 about the rotating axis AX5.

In the following description, the rotation of the bucket 8 about the bucket axis AX3 is appropriately referred to as bucket rotation, and the rotation of the bucket 8 about the tilt axis AX4 is appropriately referred to as tilt rotation, and the rotation of the bucket 8 about the rotating axis AX5 is appropriately referred to as rotation.

The swing body 2 swings by power generated by the swing motor 16. The swing motor 16 is a hydraulic motor and is driven on the basis of the hydraulic oil supplied from the hydraulic pump 17. The swing motor 16 generates power to cause the swing body 2 to swing about the swing axis RX.

The engine 5 is mounted on the swing body 2. The engine 5 generates power for driving the hydraulic pump 17.

The hydraulic pump 17 discharges the hydraulic oil for driving the hydraulic cylinder 10 and the swing motor 16.

The valve device 18 has a plurality of valves configured to distribute the hydraulic oil supplied from the hydraulic pump 17 to the plurality of hydraulic cylinders 10 and the swing motor 16. The valve device 18 adjusts the flow rate of the hydraulic oil supplied to each of the plurality of hydraulic cylinders 10. The adjustment of the flow rate of the hydraulic oil supplied to the hydraulic cylinder 10 adjusts the operating speed of the hydraulic cylinder 10. The valve device 18 regulates the flow rate of the hydraulic oil supplied to the swing motor 16. The adjustment of the flow rate of the hydraulic oil supplied to the swing motor 16 adjusts the rotation speed of the swing motor 16.

The position calculation device 20 calculates the positional data of the swing body 2. The positional data of the swing body 2 includes the position of the swing body 2, the attitude of the swing body 2, and the orientation of the swing body 2. The position calculation device 20 has a position calculator 21 configured to calculate the position of the swing body 2, an attitude calculator 22 configured to calculate the attitude of the swing body 2, and an orientation calculator 23 configured to calculate the orientation of the swing body 2.

The position calculator 21 calculates the position of the swing body 2 in a global coordinate system, as the position of the swing body 2. The position calculator 21 is arranged in the swing body 2. The global coordinate system represents a coordinate system that has the origin fixed to the earth. The global coordinate system is a coordinate system defined by a Global Navigation Satellite System (GNSS). The GNSS is a global navigation satellite system. A global positioning system (GPS) is an example of the global navigation satellite system. The GNSS has a plurality of positioning satellites. The GNSS detects a position defined by coordinate data of a latitude, a longitude, and an altitude. The swing body 2 is provided with a GPS antenna. The GPS antennas receives a radio wave from a GPS satellite and outputs a signal generated on the basis of the received radio wave to the position calculator 21. The position calculator 21 calculates the position of the swing body 2 in the global coordinate system, on the basis of the signal supplied from the GPS antenna. The position calculator 21 calculates the position of a representative point O of the swing body 2, for example, as illustrated in FIG. 3. In the example illustrated in FIG. 3, the representative point O of the swing body 2 is set on the swing axis RX. The representative point O may be set to the boom axis AX1.

The attitude calculator 22 calculates the inclination angle of the swing body 2 relative to a horizontal plane in the global coordinate system, as the attitude of the swing body 2. The attitude calculator 22 is arranged in the swing body 2. The attitude calculator 22 includes an inertial measurement unit (IMU). The inclination angle of the swing body 2 relative to the horizontal plane includes a roll angle $\alpha$ indicating an inclination angle of the swing body 2 in the vehicle width direction and a pitch angle $\beta$ indicating an inclination angle of the swing body 2 in the front-rear direction.

The orientation calculator 23 calculates the orientation of the swing body 2 relative to a reference orientation in the global coordinate system, as the orientation of the swing body 2. The reference orientation is, for example, north. The orientation calculator 23 is arranged in the swing body 2. The orientation calculator 23 includes a gyroscope sensor. The orientation calculator 23 may calculate the orientation on the basis of the signal supplied from the GPS antenna. The orientation of the swing body 2 relative to the reference orientation includes a yaw angle $\gamma$ indicating an angle formed by the reference orientation and the orientation of the swing body 2.

Figure 4:
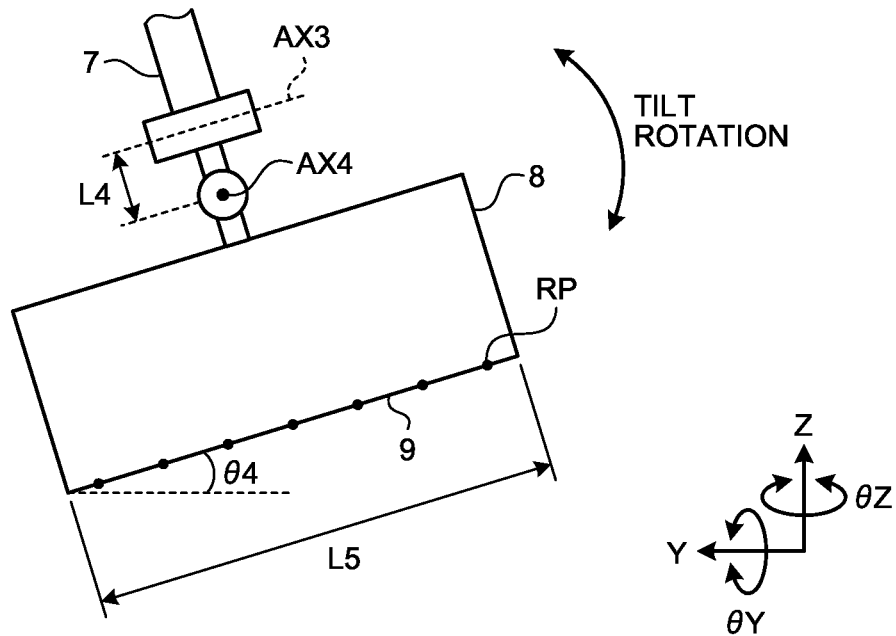
FIG. 4(A) and FIG. 4(B) are diagrams schematically illustrating a bucket according to the present embodiment.
Figure 4:
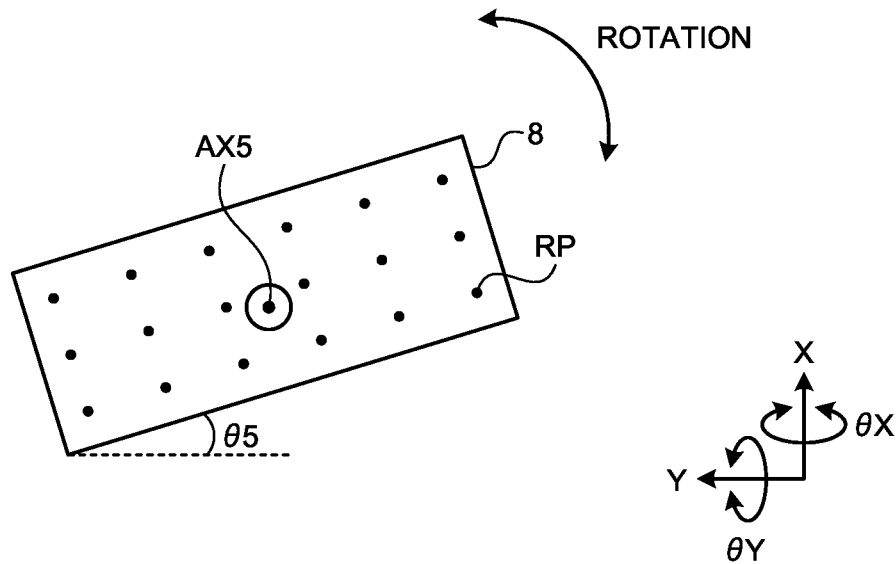

The angle detection device 30 detects the angles $\theta$ of the working equipment 1. The angle detection device 30 is arranged in the working equipment 1. As illustrated in FIGS. 3 and 4, the angles $\theta$ of the working equipment 1 include a boom angle $\theta 1$ that indicates the angle of the boom 6 relative to the Z-axis, an arm angle $\theta 2$ that indicates the angle of the arm 7 relative to the boom 6, a bucket angle $\theta 3$ that indicates the angle of the bucket 8 in a bucket rotation direction relative to the arm 7, a tilt angle $\theta 4$ that indicates the angle of the bucket 8 in a tilt rotation direction relative to an XY plane, and a rotation angle $\theta 5$ that indicates the angle of the bucket 8 in a rotation direction relative to a YZ plane.

The angle detection device 30 has a boom angle detector 31 that detects the boom angle $\theta 1$, an arm angle detector 32 that detects the arm angle $\theta 2$, a bucket angle detector 33 that detects the bucket angle $\theta 3$, a tilt angle detector 34 that detects the tilt angle $\theta 4$, and a rotation angle detector 35 that detects the rotation angle $\theta 5$. The angle detection device 30 may include a stroke sensor configured to detect a stroke of the hydraulic cylinder 10, or may include an angle sensor, such as a rotary encoder, configured to detect the angles $\theta$ of the working equipment 1. When the angle detection device 30 includes the stroke sensor, the angle detection device 30 calculates the angles $\theta$ of the working equipment 1 on the basis of detection data of the stroke sensor.

The operation device 40 is operated by the driver to drive the hydraulic cylinder 10 and the swing motor 16. The operation device 40 is arranged in the cab 4. Operation of the operation device 40 by the driver operates the working equipment 1. The operation device 40 includes a lever that is operated by the driver of the excavator 100. The lever of the operation device 40 includes a right operating lever 41, a left operating lever 42, and a tilt operating lever 43.

When the right operating lever 41 in a neutral position is operated forward, the boom 6 is operated to lower, and when the right operating lever 41 is operated backward, the boom 6 is operated to rise. When the right operating lever 41 in the neutral position is operated rightward, the bucket 8 dumps, and when the right operating lever 41 is operated leftward, the bucket 8 digs.

When the left operating lever 42 in a neutral position is operated forward, the arm 7 dumps, and when the left operating lever 42 is operated backward, the arm 7 digs. When the left operating lever 42 in the neutral position is operated rightward, the swing body 2 swings rightward, and when the left operating lever 42 is operated to leftward, the swing body 2 swings leftward.

Operation of the tilt operating lever 43 causes a tilt rotation or rotation of the bucket 8.

[Control Device]

Figure 5:
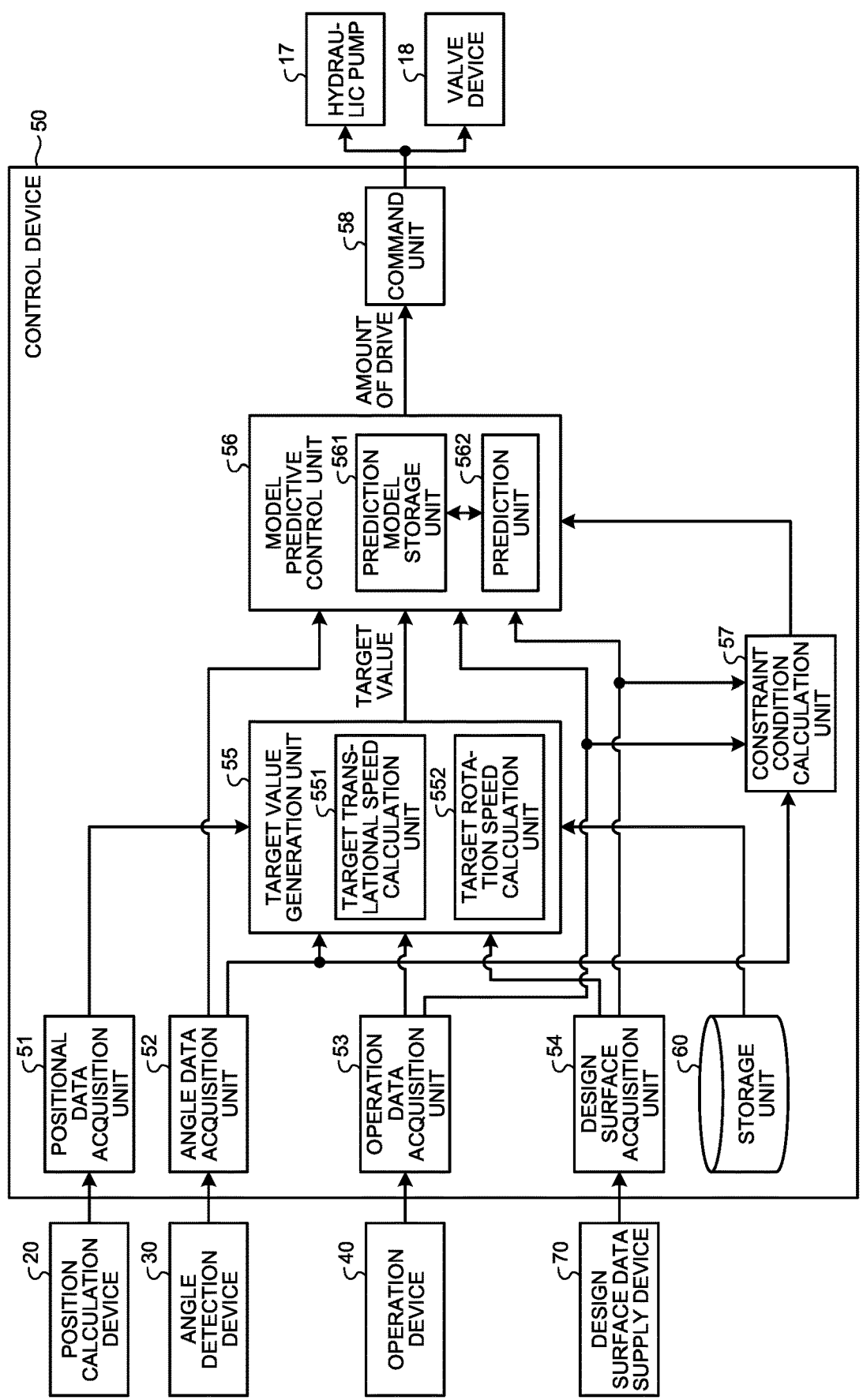
FIG. 5 is a functional block diagram illustrating a control device according to the present embodiment.

FIG. 5 is a functional block diagram illustrating the control device 50 according to the present embodiment. The control device 50 includes a positional data acquisition unit 51, an angle data acquisition unit 52, an operation data acquisition unit 53, a design surface acquisition unit 54, a target value generation unit 55, a model predictive control unit 56, a constraint condition calculation unit 57, a command unit 58, and a storage unit 60.

The positional data acquisition unit 51 acquires the positional data of the swing body 2 from the position calculation device 20. The positional data of the swing body 2 includes the position of the swing body 2, the attitude of the swing body 2, and the orientation of the swing body 2.

The angle data acquisition unit 52 acquires angle data indicating the angles $\theta$ of the working equipment 1 from the angle detection device 30. The angle data of the working equipment 1 includes the boom angle $\theta 1$, the arm angle $\theta 2$, the bucket angle $\theta 3$, the tilt angle $\theta 4$, and the rotation angle $\theta 5$.

The operation data acquisition unit 53 acquires operation data of the operation device 40 operating the working equipment 1 and the swing body 2. The operation data of the operation device 40 includes an amount of operation of the operation device 40. The operation device 40 is provided with an operation amount sensor that detects an amount of operation of each lever. The operation data acquisition unit 53 acquires the operation data of the operation device 40 from the operation amount sensor of the operation device 40.

The design surface acquisition unit 54 acquires a design surface that indicates a target shape of a construction target. The design surface indicates a three-dimensional target shape after construction by the excavator 100. In the present embodiment, a design surface data supply device 70 generates design surface data that indicates the design surface. The design surface acquisition unit 54 acquires the design surface data from the design surface data supply device 70. The design surface data supply device 70 may be provided at a distant place from the excavator 100. The design surface data generated by the design surface data supply device 70 may be transmitted to the control device 50 via a communication system. Note that the design surface data generated by the design surface data supply device 70 may be stored in the storage unit 60. The design surface acquisition unit 54 may acquire the design surface data from the storage unit 60.

The target value generation unit 55 generates a target value of an amount of control of the working equipment 1. In the present embodiment, the amount of control of the working equipment 1 includes one or both of a moving speed of the bucket 8 and the position of a predetermined portion of the bucket 8. The predetermined portion of the bucket 8 includes the blade edge 9 of the bucket 8. The moving speed of the bucket 8 includes a moving speed of the blade edge 9. The position of the predetermined portion of the bucket 8 includes the position of the blade edge 9. The target value generation unit 55 generates the target value of the amount of control of the working equipment 1, on the basis of the operation data acquired by the operation data acquisition unit 53. Furthermore, the target value generation unit 55 generates a target value of an amount of control of the swing body 2. In the present embodiment, the amount of control of the swing body 2 includes a swing speed of the swing body 2. The target value generation unit 55 generates the target value of the amount of control of the swing body 2, on the basis of the operation data acquired by the operation data acquisition unit 53. In the present embodiment, the target value generation unit 55 generates a target value of an amount of control relating to the tilt rotation of the bucket 8 and a target value of an amount of control relating to the swing of the swing body 2, on the basis of at least the operation data obtained upon operation of the working equipment 1 and the swing body 2, and the design surface.

The amount of control relating to the tilt rotation of the bucket 8 includes at least one of the tilt angle θ4 indicating the position of the bucket 8 in a tilt direction, a tilt speed indicating a rotation speed of the bucket 8 in the tilt direction, and a tilt acceleration indicating a rotational acceleration of the bucket 8 in the tilt direction. The amount of control relating to the swing of the swing body 2 includes the swing speed of the swing body 2.

In the following description, it is assumed that the predetermined portion of the bucket 8 is the blade edge 9. Note that the predetermined portion of the bucket 8 may not necessarily be the blade edge 9. The predetermined portion of the bucket 8 may be a floor surface (bottom surface) of the bucket 8.

The moving speed of the bucket 8 includes a translational speed and a rotation speed of the bucket 8. The translational speed of the bucket 8 represents a moving speed in each of the X-axis direction, the Y-axis direction, and the Z-axis direction. The rotation speed of the bucket 8 represents a rotational angular speed in each of the OX direction, the OY direction, and the θZ direction. In the present embodiment, the target value generation unit 55 includes a target translational speed calculation unit 551 configured to calculate a target translational speed $v_{target}$ that is a target value of the translational speed, and a target rotation speed calculation unit 552 configured to calculate a target rotation speed $\omega_{target}$ that is a target value of the rotation speed. The target value generation unit 55 calculates each of the target translational speed $v_{target}$ and the target rotation speed $\omega_{target}$, on the basis of the angle data acquired by the angle data acquisition unit 52, the operation data acquired by the operation data acquisition unit 53, and the design surface acquired by the design surface acquisition unit 54.

Figure 6:
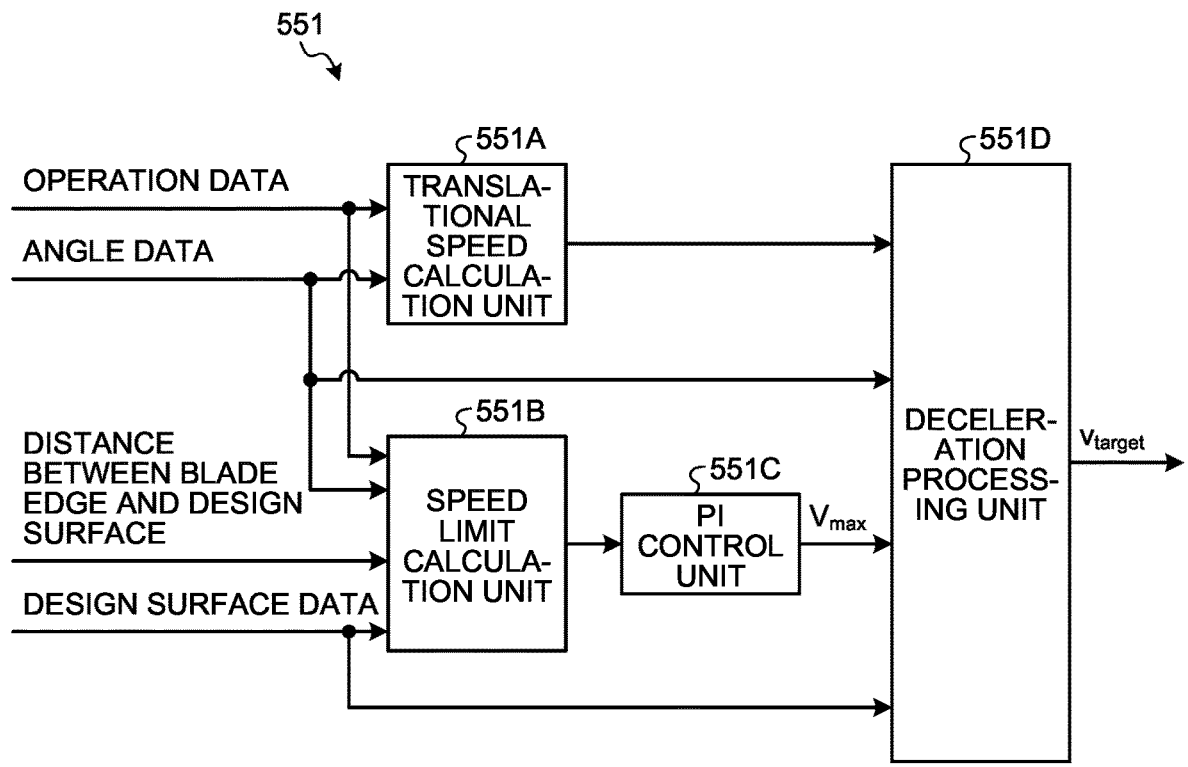
FIG. 6 is a diagram illustrating a method of calculating a target translational speed of the bucket by a target translational speed calculation unit according to the present embodiment.

FIG. 6 is a diagram illustrating a method of calculating the target translational speed $v_{target}$ of the bucket 8 by the target translational speed calculation unit 551 according to the present embodiment. The target translational speed calculation unit 551 includes a translational speed calculation unit 551A configured to calculate the translational speed of the bucket 8 on the basis of the operation data of the operation device 40 and the angle data of the working equipment 1, a speed limit calculation unit 551B configured to calculate a speed limit of the bucket 8 on the basis of a distance between the blade edge 9 and the design surface and the design surface data, a PI control unit 551C, and a deceleration processing unit 551D.

The target translational speed calculation unit 551 calculates the target translational speed $v_{target}$ of the bucket 8 so as not to dig below the design surface. The target translational speed $v_{target}$ of the bucket 8 is calculated on the basis of formulas (1) to (6).

$$v_{targent} = {}^w R_1 \begin{bmatrix} 1 & 0 & 0 \\ 0 & 0 & 0 \\ 0 & 0 & 1 \end{bmatrix}(a+b) + j_v \begin{bmatrix} \dot{\theta}_{ope_1} & 0 & 0 & 0 \end{bmatrix}^T \tag{1}$$

$$a = \begin{cases} ({}^1 v_{sagyo} \cdot {}^1 e_{xz})^1 e_{xz} & (({}^1 v_{sagyo} \cdot {}^1 e_{xz}) > V_{MAX}) \\ V_{MAX} {}^1 e_{xz} & (({}^1 v_{sagyo} \cdot {}^1 e_{xz}) \leq V_{MAX}) \end{cases} \tag{2}$$

$$b = {}^1 v_{sayo} - ({}^1 v_{sagyo} \cdot {}^1 e_{xz})^1 e_{xz} \tag{3}$$

$${}^1 e_{xz} = -\begin{bmatrix} 1 & 0 & 0 \\ 0 & 0 & 0 \\ 0 & 0 & 1 \end{bmatrix} {}^1 R_w n \tag{4}$$

$$v_{sagyo} = J_v \begin{bmatrix} 0 & 0 & 0 & 0 & 0 \\ 0 & 1 & 0 & 0 & 0 \\ 0 & 0 & 1 & 0 & 0 \\ 0 & 0 & 0 & 0 & 0 \\ 0 & 0 & 0 & 0 & 0 \end{bmatrix} \dot{\theta}_{ope} \tag{5}$$

$$J = \begin{bmatrix} J_v \\ J_\omega \end{bmatrix} \tag{6}$$

$n \in R^3$ is a unit normal vector of the design surface closest to the blade edge 9, $^w R_1 \in R^{3 \times 3}$ is a rotation matrix for transformation from the vehicle body coordinate system to the global coordinate system, $v_{sagyo} \in R^3$ is a translational speed component of the bucket operated by the boom 6 and the arm 7 on a working equipment plane (XZ plane in the vehicle body coordinate system) of the translational speed upon operation of the working equipment 1 based on the operation of the operation device 40, and $V_{MAX}$ is a maximum speed of the bucket 8 in a direction normal to the design surface, for prevention of digging below the design surface. $J_v \in R^{3 \times 5}$ and $J_\omega \in R^{3 \times 5}$ represent a translational speed component and a rotation speed component of the Jacobian matrix, respectively.

The target translational speed calculation unit 551 is configured to calculate the distance between the blade edge 9 and the design surface, on the basis of the positional data of the swing body 2 acquired by the positional data acquisition unit 51, the angle data of the working equipment 1 acquired by the angle data acquisition unit 52, and working equipment data stored in the storage unit 60. As illustrated in FIGS. 3 and 4, the working equipment data includes a boom length L1, an arm length L2, a bucket length L3, a tilt length L4, and a bucket width L5. The boom length L1 is a distance between the boom axis AX1 and the arm axis AX2. The arm length L2 is a distance between the arm axis AX2 and the bucket axis AX3. The bucket length L3 is a distance between the bucket axis AX3 and the blade edge 9 of the bucket 8. The tilt length L4 is a distance between the bucket axis AX3 and the tilt axis AX4. The bucket width L5 is a dimension in a width direction of the bucket 8. The working equipment data includes bucket profile data that indicates the shape and dimensions of the bucket 8. The bucket profile data includes external surface data of the bucket 8 including the profile of an external surface of the bucket 8. The bucket profile data includes coordinate data of a plurality of outline points RP of the bucket 8 on the basis of the predetermined portion of the bucket 8.

The target translational speed calculation unit 551 calculates positional data of each of the outline points RP. The target translational speed calculation unit 551 calculates a relative position between the representative point O of the swing body 2 and each of the plurality of outline points RP, in the vehicle body coordinate system. The target translational speed calculation unit 551 is configured to calculate the relative position between the representative point O of the swing body 2 and each of the plurality of outline points RP of the bucket 8, in the vehicle body coordinate system, on the basis of the working equipment data including the boom length L1, the arm length L2, the bucket length L3, the tilt length L4, the bucket width L5, and the bucket profile data, and the angle data of the working equipment 1 including the boom angle θ1, the arm angle θ2, the bucket angle θ3, the tilt angle θ4, and the rotation angle θ5. Setting of the outline points RP to the blade edge 9 makes it possible for the target translational speed calculation unit 551 to calculate a relative position between the representative point O and the blade edge 9. The design surface is defined in the vehicle body coordinate system. Therefore, the target translational speed calculation unit 551 is allowed to calculate the distance between the blade edge 9 and the design surface in the vehicle body coordinate system. In addition, the target translational speed calculation unit 551 calculates a position of each of the plurality of outline points RP in the global coordinate system. The target translational speed calculation unit 551 is allowed to calculate the position of each outline point RP of the bucket 8 in the global coordinate system, on the basis of an absolute position of the representative point O of the swing body 2 and the relative position between the representative point O of the swing body 2 and the position of the outline point RP of the bucket 8.

The speed limit calculation unit 551B determines a speed limit of the boom 6 in the direction normal to the design surface by using a speed limit table indicating a relationship of the distance between the bucket 8 and the design surface to a speed limit of the working equipment 1.

Figure 7:
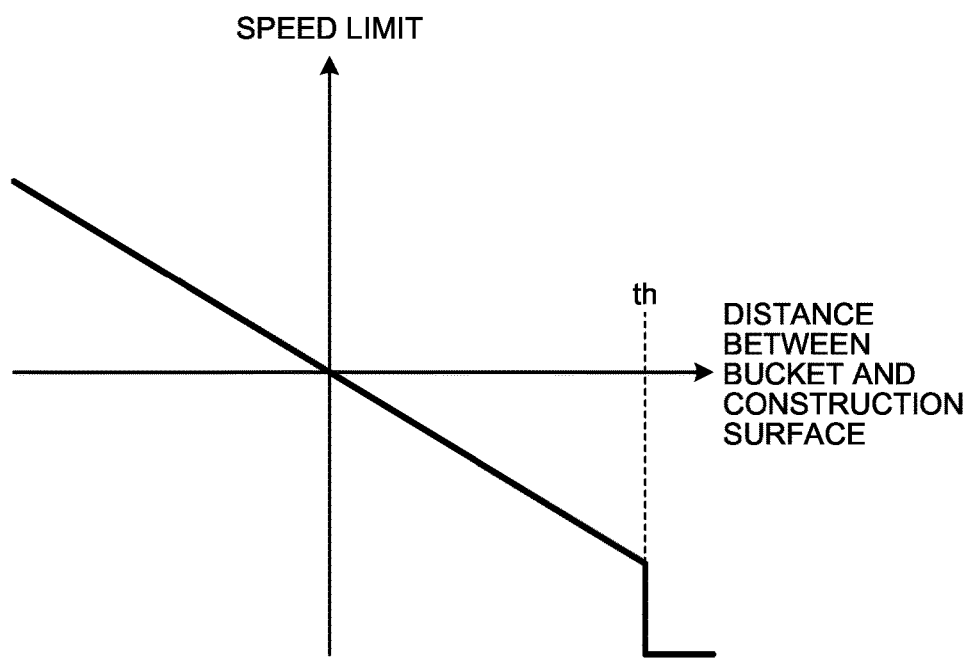
FIG. 7 is a graph illustrating an example of a speed limit table according to the present embodiment.

FIG. 7 is a graph illustrating an example of the speed limit table according to the present embodiment. As illustrated in FIG. 7, the speed limit table indicates the relationship of the distance between the blade edge 9 and the design surface to the speed limit of the working equipment 1. In the speed limit table, when the distance between the blade edge 9 and the design surface is 0, the speed of the working equipment 1 in the direction normal to the design surface becomes 0. In the speed limit table, when the blade edge 9 is placed above a construction surface, the distance between the blade edge 9 and the design surface has a positive value. When the blade edge 9 is placed below the construction surface, the distance between the blade edge 9 and the construction surface has a negative value. In the speed limit table, a speed for moving the blade edge 9 upward has a positive value. When the distance between the blade edge 9 and the construction surface is equal to or less than a working equipment control threshold th that has a positive value, the speed limit of the working equipment 1 is defined on the basis of the distance between the blade edge 9 and the construction surface. When the distance between the blade edge 9 and the construction surface is equal to or larger than the working equipment control threshold th, an absolute value of the speed limit of the working equipment 1 has a value that is larger than a maximum value of a target speed of the working equipment 1. In other words, when the distance between the blade edge 9 and the construction surface is equal to or larger than the working equipment control threshold th, an absolute value of the target speed of the working equipment 1 is always smaller than the absolute value of the speed limit, and thus, the boom 6 is always driven at the target speed.

Figure 8:
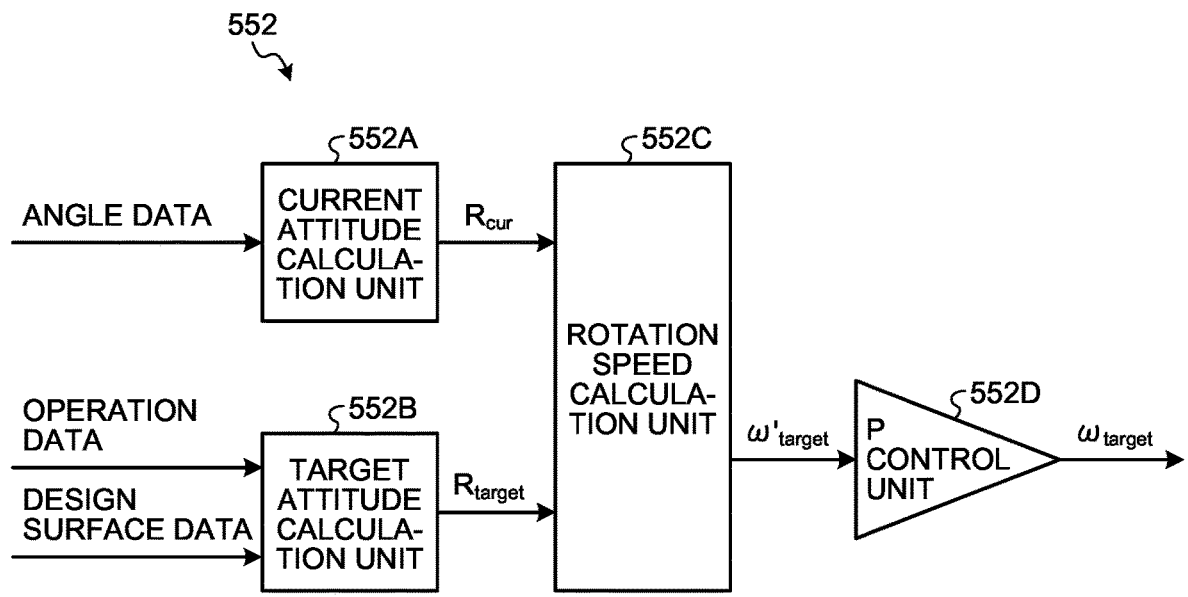
FIG. 8 is a diagram illustrating a method of calculating a target rotation speed of the bucket by a target rotation speed calculation unit according to the present embodiment.

FIG. 8 is a diagram illustrating a method of calculating the target rotation speed $\omega_{target}$ m of the bucket 8 by the target rotation speed calculation unit 552 according to the present embodiment. The target rotation speed calculation unit 552 includes a current attitude calculation unit 552A configured to calculate a current attitude $R_{cur}$ of the bucket 8 on the basis of the angle data of the working equipment 1, a target attitude calculation unit 552B configured to calculate a target attitude $R_{target}$ of the bucket 8 on the basis of the operation data of the operation device 40 and the design surface data, a rotation speed calculation unit 552C configured to calculate a rotation speed $\omega'_{target}$ on the basis of the current attitude $R_{cur}$ and the target attitude $R_{target}$ of the bucket 8, and a P control unit 552D configured to perform P control on the rotation speed $\omega'_{target}$ to calculate the target rotation speed $\omega_{target}$.

The rotation speed $\omega'_{target}$ is calculated on the basis of formulas (7) to (10).

$$\omega'_{target} = R_{cur}\omega \tag{7}$$

$$\theta = \cos^{-1}\left(\frac{r_{11} + r_{22} + r_{33} - 1}{2}\right) \tag{8}$$

$$\omega = \begin{cases} [0\ 0\ 0]^T & (\theta = 0) \\ \dfrac{\theta}{2\Delta T_{target}\sin\theta} \begin{bmatrix} r_{32} - r_{23} \\ r_{13} - r_{31} \\ r_{21} - r_{12} \end{bmatrix} & (\theta \neq 0) \end{cases} \tag{9}$$

$$R = \begin{bmatrix} r_{11} & r_{12} & r_{13} \\ r_{21} & r_{22} & r_{23} \\ r_{31} & r_{32} & r_{33} \end{bmatrix} = R_{cur}^T R_{target} \tag{10}$$

$\Delta T_{target}$ is a parameter corresponding to a time required to correct the attitude of the bucket 8. The P control unit 552D calculates the target rotation speed $\omega_{target}$ by performing P control on the basis of the rotation speed $\omega_{target}$ calculated by the rotation speed calculation unit 552C.

The model predictive control unit 56 calculates a predicted value of the amount of control of the working equipment 1 and a predicted value of the amount of control of the swing body 2, on the basis of the target value of the amount of control of the working equipment 1 and the target value of the amount of control of the swing body 2 which are generated by the target value generation unit 55 and a prediction model for the excavator 100 including the working equipment 1 and the swing body 2. The model predictive control unit 56 calculates an amount of drive to control the working equipment 1 and the swing body 2, on the basis of the predicted value of the amount of control of the working equipment 1, the predicted value of the amount of control of the swing body 2, and the design surface so as to maintain the distance between the predetermined portion of the bucket 8 and the design surface and the attitude of the bucket 8, that is, so that the bucket 8 follows a target design surface in a predetermined attitude. The predicted value of the amount of control of the working equipment 1 also includes a predicted value relating to the tilt rotation of the bucket 8.

A prediction model storage unit 561 stores the prediction model for the excavator 100 including the working equipment 1 and the swing body 2. The prediction model includes a dynamic model for the excavator 100. The prediction model includes a model for the swing body 2 that swings about the swing axis RX, a model for the boom 6 that rotates about the boom axis AX1, a model for the arm 7 that rotates about the arm axis AX2, and a model for the bucket 8 that rotates about the bucket axis AX3, tilt axis AX4, and rotating axis AX5.

The prediction model is represented by a discrete state equation and an output equation. The state equation of the prediction model for control of the excavator 100, discretized with a sampling time $\Delta T$ is shown in formula (11). Matrices of the state equation is shown in formulas (12) and (13). The output equation of the prediction model is shown in formula (14).

$$\begin{bmatrix} \theta(t+1) \\ \dot{\theta}(t+1) \end{bmatrix} = A \begin{bmatrix} \theta(t) \\ \dot{\theta}(t) \end{bmatrix} + B \begin{bmatrix} \tau(t) \\ -C_o(t) \\ C_{tay}(t) \end{bmatrix} \quad (11)$$

$$A = \begin{bmatrix} I_{5x5} & I_{5x5}\Delta T \\ O_{5x5} & I_{5x5} \end{bmatrix} \in R^{10x10} \quad (12)$$

$$B = \begin{bmatrix} \frac{1}{2}\Delta T^2 M^{-1} & \frac{1}{2}\Delta T^2 M^{-1} & O_{5x4} \\ \Delta T M^{-1} & \Delta T M^{-1} & O_{5x4} \end{bmatrix} \in R^{10\times 10} \quad (13)$$

$$\begin{bmatrix} v(t) \\ \omega(t) \\ \theta(t)^T \\ \dot{\theta}(t)^T \\ d(t) \\ Q_A(t) \end{bmatrix} = C \begin{bmatrix} \theta(t) \\ \dot{\theta}(t) \end{bmatrix} + D \begin{bmatrix} \tau(t) \\ -C_o(t) \\ C_{tay}(t) \end{bmatrix} \quad (14)$$

Each of $M \in R^{5\times 5}$ and $C_o \in R^5$ is an inertial matrix of an equation of motion and a Coriolis force/gravity vector. $C_{tay} \in R^{2nP}$ is a constant term when a tailor expansion of n·p around an angle $\theta$ is performed at the predetermined time t. $n_p$ is the number of design surfaces to be considered. Outputs from the output equation of the prediction model are an angle $\theta$, an angular speed, the target translational speed $v_{target}$, the target rotation speed $\omega_{target}$, the distance d between the blade edge 9 and the design surface, and the flow rate Q of the hydraulic oil.

A prediction unit 562 performs an optimization operation on the basis of the prediction model and calculates the predicted value of the amount of control of each of the working equipment 1 and the swing body 2. As described above, in the present embodiment, the amount of control of the working equipment 1 includes one or both of the moving speed of the bucket 8 and the position of the predetermined portion of the bucket 8. The predetermined portion of the bucket 8 includes the blade edge 9. Furthermore, the amount of control of the working equipment 1 includes an angular speed of the boom 6, an angular speed of the arm 7, and an angular speed of the bucket 8. The angular speed of the bucket 8 includes an angular speed about the bucket axis AX3, an angular speed about the tilt axis AX4, and an angular speed about the rotating axis AX5.

In the present embodiment, the prediction unit 562 calculates a predicted value of the amount of control relating to the tilt rotation of the bucket 8 on the basis of the target value of the amount of control relating to the tilt rotation of the bucket 8 and the prediction model, and controls the working equipment 1 on the basis of the predicted value. As described above, the amount of control relating to the tilt rotation of the bucket 8 includes at least one of the tilt angle θ4, the tilt speed, and the tilt acceleration of the bucket 8. Furthermore, the prediction unit 562 calculates the predicted value of the amount of control of the swing body 2 on the basis of the target value of the amount of control of the swing body 2 and the prediction model, and controls the swing body 2 on the basis of the predicted value so that the bucket 8 follows the target design surface in the predetermined attitude.

The prediction unit 562 predicts a value on the left side of formula (14) several steps ahead from the present time.

The prediction unit 562 calculates the amount of drive to control the working equipment 1, on the basis of at least one of a predicted value of the moving speed of the bucket 8, a predicted value of the angular speed of each axis, a predicted value of the position of the blade edge 9 of the bucket 8, and a predicted value of the flow rate of the hydraulic oil. The prediction unit 562 calculates the amount of drive so that the predicted value of the amount of control follows the target value thereof. The prediction unit 562 calculates the amount of drive to control the swing body 2 on the basis of a predicted value of the swing speed of the swing body 2.

In the present embodiment, the prediction unit 562 calculates the amount of drive so that the bucket 8 in a predetermined attitude follows a target design surface, on the basis of the predicted value of the moving speed of the bucket 8, the predicted value of the angular speed of each axis, the predicted value of the position of the blade edge 9 of the bucket 8, the predicted value of the flow rate of the hydraulic oil, a predicted value of a swing speed of the swing body 2 and the design surface. In other words, the prediction unit 562 calculates the amount of drive so that the bucket 8 does not dig below the design surface and the position of the blade edge 9 and the position of the design surface coincide with each other.

The prediction unit 562 calculates the amount of drive to control the working equipment 1 and the swing body 2 so that an evaluation function has a minimum value and each constraint condition is satisfied.

In model predictive control, the evaluation function as shown in formula (15) is generally used.

$$E(t)=E_y(t)\pm E_u(t)+E_{\Delta u}(t)+E_c(t) \quad (15)$$

$E_y(t)$ is a difference between a target value and a predicted value in output, $E_u(t)$ is a difference between a target value and a predicted value in input, $E\Delta_u(t)$ is a magnitude of the change in input, and $E_c(t)$ is a penalty function that is imposed when the constraint conditions which are described later are not satisfied. In the present embodiment, $E_u(t)=0$ and $E\Delta_u(t)=0$, and a tracking error in output with respect to the target value in output is used as the evaluation function. The evaluation function is shown in formulas (16) and (17).

$$E(t) = \sum_{i=1}^{H_p} \Delta r_i(t+i \mid t)^T W \Delta r_i(t+i \mid t) + E_c(t) \quad (16)$$

$$\Delta r_i(t+i \mid t) = r_i(t+i \mid t) - y(t+i \mid t) \quad (17)$$

r(t+i|t) is a target value of time t+i at the time t, y(t+i|t) is a plant output at the time t+i predicted at the time t, $H_p$ is a prediction horizon that determines how many steps ahead a prediction is made, and W is a diagonal matrix that weights to make a prediction variables.

The constraint condition calculation unit 57 calculates the constraint conditions. The constraints include a first constraint condition relating to the performance of the excavator 100 and a second constraint condition relating to the position of the bucket 8. The prediction unit 562 calculates the amount of drive so as to satisfy the constraint conditions calculated by the constraint condition calculation unit 57.

The excavator 100 as a control target has a limit on the angles θ, angular speed, angular acceleration, and the flow rate of the hydraulic oil, of the working equipment 1. For example, each angle θ through which the working equipment 1 is movable has a limit. Likewise, each of the angular speed and angular acceleration of the working equipment 1 has a limit. Furthermore, the flow rate of the hydraulic oil discharged from the hydraulic pump 17 has a limit. As described above, the excavator 100 has a limit on hardware. Therefore, it is necessary to consider the first constraint condition indicating limitation on the hardware of the excavator 100, also in the model predictive control. The constraint condition calculation unit 57 calculates the first constraint condition including the angles θ, angular speed, angular acceleration, and flow rate of the hydraulic oil, of the working equipment 1. The prediction unit 562 calculates the amount of drive so as to satisfy the first constraint condition.

The constraint conditions of the angles θ, the angular speed, and the flow rate of the hydraulic oil are shown in formulas (18) to (21).

$$\theta \le \theta(t) \le \theta_{max} \quad (18)$$

$$\dot{\theta}_{min} \le \dot{\theta}(t) \le \dot{\theta}_{max} \quad (19)$$

$$Q_A(t) = \sum_{i=1}^{5} Q_i \le Q_{A_{max}} \quad (20)$$

$$Q_A = G\dot{\theta} \le Q_{A_{max}} 1_{32 \times 1} \quad (21)$$

The constraint condition of the angular acceleration is shown in formula (22).

$$\ddot{\theta}_{min} \le \ddot{\theta}(t) \le \ddot{\theta}_{max} \quad (22)$$

In the present embodiment, the constraint condition calculation unit 57 converts the constraint condition of the angular acceleration into the constraint condition of torque. The constraint condition of the angular acceleration after conversion is shown in formula (23).

$$\ddot{\theta}_{min} \le M^{-1}(t)\tau(t) - M^{-1}(t)C_o(t) \le \ddot{\theta}_{max} \quad (23)$$

In control of the working equipment 1, it is necessary to prevent the bucket 8 from digging below the design surface. In other words, the bucket 8 has a limit on position so as not to dig below the design surface. Therefore, it is necessary to consider the second constraint condition indicating limitation on the position of the bucket 8, also in the model predictive control. The constraint condition calculation unit 57 calculates the second constraint condition including the position of the bucket 8 relative to the design surface. The prediction unit 562 calculates the amount of drive so as to satisfy the second constraint condition.

An output d(t) indicates the distance between the blade edge 9 and the design surface. An equation of the i-th design surface is represented by a unit normal vector $n_i$ as $n \cdot p + d_i = 0$. Formulas (24) and (25) show the constraint conditions for preventing the right and left ends of the blade edge 9 from digging below the design surface.

$$n_i \cdot p_L(t) \ge -d_i \quad (24)$$

$$n_i \cdot p_R(t) \ge -d_i \quad (25)$$

The coordinates of the blade edge 9 are non-linear with respect to an angle θ in a state variable. Therefore, a linear approximation is applied as shown in formulas (26) and (27).

$$n_i \cdot p_L(t) = C_{i_L}\theta(t) + C_{tay_{i_L}} \quad (26)$$

$$n_i \cdot p_R(t) = C_{i_R}\theta(t) + C_{tay_{i_R}} \quad (27)$$

The prediction unit 562 uses the evaluation functions shown in formulas (16) and (17) to perform the optimization operation in the model predictive control so as to satisfy the constraint conditions shown in formulas (18) to (27). An optimization problem in the present embodiment is shown in formula (28). For example, quadratic programming (QP) is used for the optimization operation, but another calculation method may be used.

$$\begin{aligned} &\underset{\tau(1),\ldots,\tau(1+(H_u-1)\Delta T)}{\text{minimize}} E(t) \quad (28)\\ &\text{subject to } \theta_{min} \le \theta(t) \le \theta_{max}\\ &\dot{\theta}_{min} \le \dot{\theta}(t) \le \dot{\theta}_{max}\\ &\ddot{\theta}_{min} \le M^{-1}\tau - M^{-1}C_o \le \ddot{\theta}_{max}\\ &G\dot{\theta} \le Q_{A_{max}} 1_{32 \times 1}\\ &n_i \cdot p_L(t) = C_{i_L}\theta(t) + C_{tay_{i_L}} \ge -d_i\\ &n_i \cdot p_R(t) = C_{i_R}\theta(t) + C_{tay_{i_R}} \ge -d_i\\ &(i = 1, 2, \ldots, n_p) \end{aligned}$$

τ(t) is a control input torque for a control plant and is a solution of the optimization operation. $H_u$ is a control horizon that determines how many steps ahead the inputs are to be handled in the optimization problem.

The prediction unit 562 outputs a control command to control the swing speed of the swing body 2, on the basis of the predicted value of the amount of control relating to the tilt rotation of the bucket 8 and a predicted value of the amount of control relating to the swing of the swing body 2 that have been predicted, so that the distance between the blade edge 9 of the bucket 8 and the design surface and the attitude of the bucket 8 are maintained. The swing body 2 swings on the basis of the operation of the operation device 40 by the driver. When the swing speed of the swing body 2 swung on the basis of the operation of the operation device 40 is excessively high, the prediction unit 562 outputs a restriction command to control the valve device 18 on the basis of the predicted value of the swing speed of the swing body 2 so as to reduce the swing speed of the swing body 2. As described above, the valve device 18 is configured to adjust the flow rate of the hydraulic oil supplied to the swing motor 16. The adjustment of the flow rate of the hydraulic oil supplied to the swing motor 16 adjusts the rotation speed of the swing motor 16 and the swing speed of the swing body 2. The output of the restriction command from the prediction unit 562 to the valve device 18 reduces the flow rate of the hydraulic oil supplied to the swing motor 16. The reduction of the flow rate of the hydraulic oil supplied to the swing motor 16 reduces the swing speed of the swing body 2.

Figure 9:
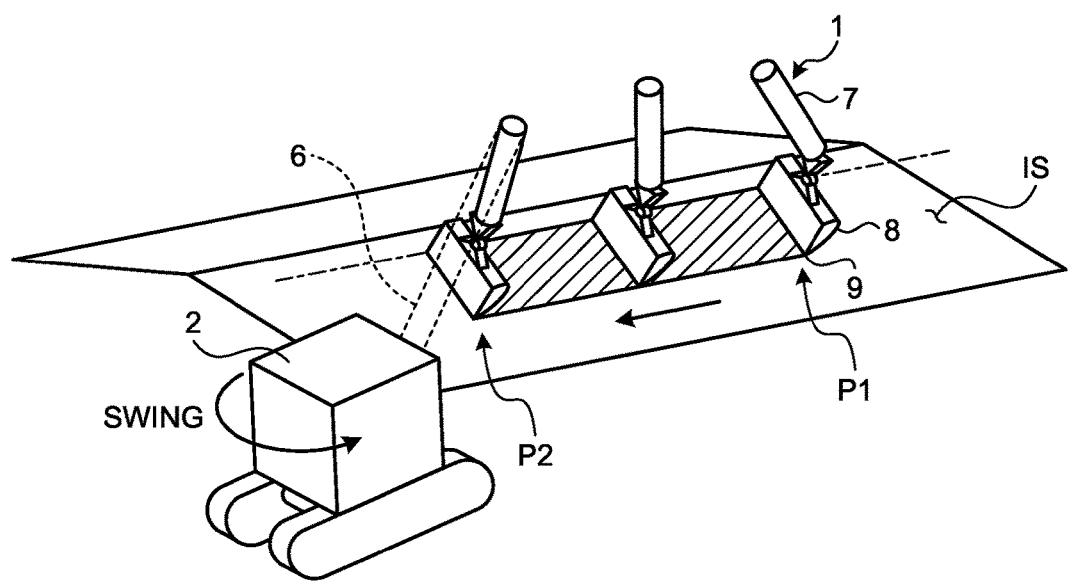
FIG. 9 is a diagram illustrating an example of an operation of the construction machine according to the present embodiment.
Figure 10:
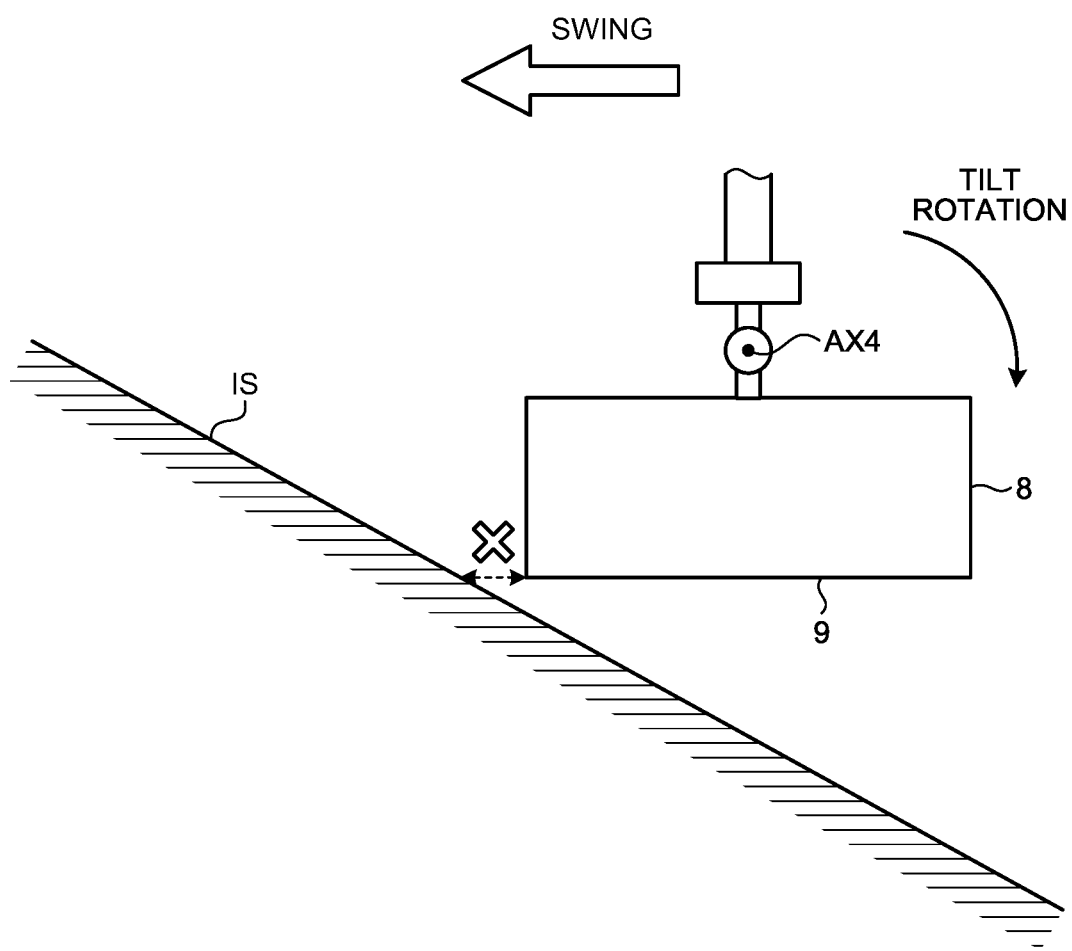
FIG. 10 is a diagram illustrating an example of an operation of the construction machine according to the present embodiment.

Each of FIGS. 9 and 10 is a diagram illustrating an example of an operation of the excavator 100 according to the present embodiment. As illustrated in FIG. 9, the design surface IS including a slope is set. The excavator 100 is configured to form the slope on the construction target by operating the working equipment 1 so that the bucket 8 that is capable of tilt rotation approaches the swing body 2. When forming the slope on the construction target, the driver of the excavator 100 operates the operation device 40 to move the bucket 8 from a first position P1 of the design surface IS to a second position P2 that is closer to the swing body 2 than the first position P1.

As illustrated in FIG. 9, when the position of the center of the swing body 2 and the position of the center of the design surface IS are different from each other in the vehicle width direction, the working equipment 1 is operated while swinging the swing body 2 so as to prevent the bucket 8 from digging the design surface IS, in some cases. In the example illustrated in FIG. 9, the center of the design surface IS is positioned on the left side from the center of the swing body 2 in the vehicle width direction. Accordingly, when moving the bucket 8 from the first position P1 to the second position P2, the working equipment 1 needs to be operated while swinging the swing body 2 leftward in order for the blade edge 9 of the bucket 8 to follow the design surface IS.

The swing body 2 swings on the basis of the operation of the operation device 40 by the driver. When the swing body 2 swings by operation of the operation device 40, if the swing body 2 has a high swing speed, the bucket 8 may dig below the design surface, preventing excavation of the construction target into a desired shape. In other words, when the swing speed of the swing body 2 is high, the tilt rotation of the bucket 8 at a maximum speed may cause digging below the design surface by the bucket 8 because of delay in raising one side of the blade edge 9 as illustrated in FIG. 10 due to a change in the attitude of the blade edge 9.

In the present embodiment, the prediction unit 562 calculates a predicted value of the tilt speed of the bucket 8 on the basis of the operation data of the operation device 40 operating the working equipment 1 and the swing body 2. Furthermore, the prediction unit 562 calculates the amount of drive to control the operation of the working equipment 1 including the tilt rotation of the bucket 8, on the basis of the operation data of the operation device 40 operating the working equipment 1 and the swing body 2 so that the blade edge 9 follows the design surface IS.

The command unit 58 outputs the control command to control the working equipment 1 and the swing body 2 (valve device 18) on the basis of the amount of drive calculated by the prediction unit 562.

The command unit 58 outputs the control command to control the swing of the swing body 2, on the basis of the amount of drive of the swing body 2 calculated by the prediction unit 562 when a predicted value of the tilt speed of the bucket 8 is equal to or larger than a predetermined defined value. The predicted value of the tilt speed of the bucket 8 is calculated on the basis of the operation data of the operation device 40 operating the swing body 2 so that the distance between the blade edge 9 and the design surface IS and the attitude of the bucket 8 are maintained.

The defined value relating to the tilt speed may be the maximum speed (maximum value) of the tilt speed, or may be a speed lower than the maximum speed. The maximum speed of the tilt speed is a maximum speed of the tilt rotation of the bucket 8 and is known data determined on the basis of, for example, the performance of the tilt cylinder 14 or the performance of the hydraulic pump 17.

In the present embodiment, the command unit 58 outputs the control command to control the swing speed of the swing body 2, on the basis of the amount of drive of the swing body 2 calculated by the prediction unit 562 so as to limit the swing speed of the swing body 2 when the predicted value of the tilt speed of the bucket 8 exceeds the maximum speed. The predicted value of the tilt speed of the bucket 8 is calculated based on the operation data of the operation device 40 operating the swing body 2 so that the blade edge 9 follows the design surface IS.

The bucket 8 is not able to perform tilt rotation beyond the maximum speed of the tilt speed. When the swing body 2 continues to swing at high speed on the basis of the operation of the operation device 40 even though the predicted value of the tilt speed of the bucket 8 exceeds the maximum speed, the bucket 8 may dig below the design surface IS. The prediction unit 562 is configured to calculate the predicted value of the swing speed of the swing body 2, on the basis of the operation data of the operation device 40 swinging the swing body 2. When the tilt speed of the bucket 8 exceeds the maximum speed, the command unit 58 outputs the control command so as to limit the swing speed of the swing body 2. The tilt speed of the bucket 8 is calculated on the basis of the predicted value of the swing speed of the swing body 2 so that the blade edge 9 of the bucket 8 follows the design surface IS. In other words, the command unit 58 outputs the control command to swing the swing body 2 at a swing speed that is calculated so as to prevent the bucket 8 from digging below the design surface IS when the tilt speed of the bucket 8 exceeds the maximum speed. The tilt speed of the bucket 8 is calculated so that the blade edge 9 of the bucket 8 follows the design surface IS. This inhibits the bucket 8 from digging below the design surface IS.

[Control Method]

Figure 11:
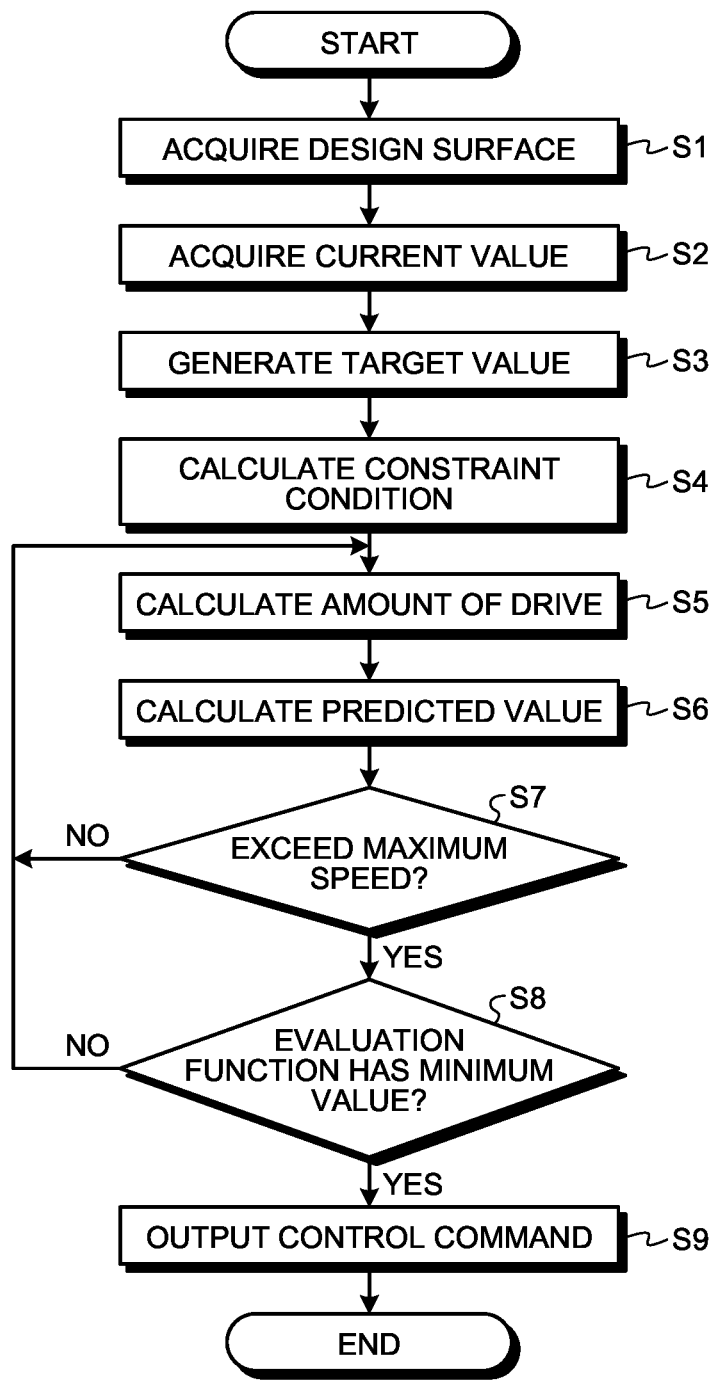
FIG. 11 is a flowchart illustrating a control method for the construction machine according to the present embodiment.

FIG. 11 is a flowchart illustrating a control method for the excavator 100 according to the present embodiment. In the present embodiment, the control method in the work such as moving the bucket 8 from the first position P1 to the second position P2 as described with reference to FIG. 9 will be described.

The design surface acquisition unit 54 acquires the design surface data (step S1).

The positional data acquisition unit 51 acquires the positional data of the swing body 2 from the position calculation device 20, as a current value. Furthermore, the angle data acquisition unit 52 acquires the angle data and angular speed data of the working equipment 1 from the angle detection device 30, as the current values (step S2).

The driver operates the operation device 40 so that the bucket 8 moves from the first position P1 to the second position P2. Furthermore, the driver operates the operation device 40 so that the swing body 2 turns while the bucket 8 is moving from the first position P1 to the second position P2. The operation data acquisition unit 53 acquires the operation data from the operation device 40. The target value generation unit 55 generates the target value of the amount of control of the working equipment 1 and the target value of the amount of control of the swing body 2 on the basis of at least the operation data of the operation device 40 (step S3).

The target value of the amount of control of the working equipment 1 includes a target value of the moving speed of the bucket 8. The target value of the amount of control of the swing body 2 includes a target value of the swing speed of the swing body 2. The target value of the moving speed of the bucket 8 includes the target translational speed $v_{target}$ of the bucket 8, described with reference to FIG. 6, and the target rotation speed $\omega_{target}$ of the bucket 8, described with reference to FIG. 8. The target value generation unit 55 calculates the target value including the target translational speed $v_{target}$ and target rotation speed $\omega_{target}$ of the bucket 8, on the basis of the operation data of the operation device 40, the angle data indicating each angle θ of the working equipment 1 that changes by operating the operation device 40 and the angular speed data thereof indicating the amount of change in each angle θ per unit time, the positional data of the swing body 2 that changes by operating the operation device 40, and the design surface data.

The constraint condition calculation unit 57 calculates the first constraint condition relating to the performance of the excavator 100 and the second constraint condition relating to the position of the bucket 8, on the basis of the operation data of the operation device 40, the angle data indicating each angle θ of the working equipment 1 that changes by operating the operation device 40 and the angular speed data indicating the amount of change in each angle θ per unit time, and the design surface data (step S4).

The prediction unit 562 calculates the amount of drive to control the working equipment 1 and the amount of drive to control the swing body 2 so as to satisfy the constraint condition calculated in step S4, on the basis of the target value of the amount of control of the working equipment 1, the target value of the amount of control of the swing body 2, and the prediction model stored in the prediction model storage unit 561 (step S5).

For the amount of drive, an amount of drive of each valve of the valve device 18 is exemplified. For the amount of drive, a torque of the working equipment 1 may be calculated.

The prediction unit 562 calculates the amount of drive of the working equipment 1 and the amount of drive of the swing body 2, for example, to ten steps ahead from the present time.

The prediction unit 562 calculates the predicted value of the amount of control of the working equipment 1 and the predicted value of the amount of control of the swing body 2, on the basis of the amount of drive calculated in step S5 and the current value acquired in step S2 (step S6).

The prediction unit 562 calculates the predicted value of the moving speed of the working equipment 1, the predicted value of the position of the blade edge 9, and the predicted value of the swing speed of the swing body 2, for example, to ten steps ahead from the present time.

The prediction unit 562 determines whether a predicted value of a bucket speed that is calculated so that the blade edge 9 of the bucket 8 follows the design surface IS exceeds a maximum speed, on the basis of the operation data of the operation device 40 operating the working equipment 1 and the swing body 2 (step S7).

In step S7, if it is determined that the predicted value of the bucket speed does not exceed the maximum speed (step S7: No), the prediction unit 562 recalculates the amount of drive so that the predicted value of the amount of control follows the target value thereof (step S5).

The prediction unit 562 recalculates the amount of drive so as to minimize the value of the evaluation function defined by the target value and the current value of the amount of control. The prediction unit 562 recalculates the amount of drive so as to satisfy the first constraint condition and the second constraint condition.

In step S7, if it is determined that the predicted value of the bucket speed exceeds the maximum speed (step S7: Yes), the prediction unit 562 determines whether the evaluation function has the minimum value (step S8).

The speed of the bucket 8 may be the angular speed or angular acceleration of each axis of the working equipment 1 or swing body 2. The maximum speed may be an upper limit. In other words, in step S7, the prediction unit 562 may determine whether a predicted value of the angular acceleration of each axis exceeds the upper limit angular acceleration.

In step S8, if it is determined that the evaluation function does not have the minimum value (step S8: No), the prediction unit 562 recalculates the amount of drive so that the predicted value of the amount of control follows the target value (step S5).

The prediction unit 562 repeats the processing of step S5, step S6, step S7, and step S8, until the evaluation function has the minimum value.

In step S8, if it is determined that the evaluation function has the minimum value (step S8: Yes), the command unit 58 outputs the control command to control the swing body 2 so as to limit the swing speed of the swing body 2, on the basis of the amount of drive to control the swing body 2 which is calculated so that the evaluation function has the minimum value. The command unit 58 outputs the control command to the valve device 18 so as to drive the valve on the basis of the amount of drive calculated by the prediction unit 562. Furthermore, the command unit 58 outputs the control command to control the working equipment 1, on the basis of the amount of drive to control the working equipment 1 which is calculated in step S5 (step S9).

As described above, the amount of drive is calculated from the present time, for example, to ten steps ahead. The command unit 58 outputs, as the control command, the amount of drive having been calculated in the first step, from the amounts of drive having been calculated ten steps ahead.

The swing body 2 swings with the swing speed limited, on the basis of the control command output from the command unit 58. This makes it possible for the bucket 8 moving from the first position P1 to the second position P2 to perform tilt rotation so as to follow the design surface IS, as described with reference to FIG. 9. Therefore, the bucket 8 does not dig below the design surface IS, leveling the construction target into the desired shape.

[Effects]

As described above, according to the present embodiment, moving the working equipment 1 and the swing body 2 by the model predictive control makes it possible for the control device 50 to output the control command to limit the swing speed of the swing body 2 so that the bucket 8 can follow the design surface IS, when the swing speed of the swing body 2 defined by the operation data of the operation device 40 is excessively high. Therefore, the bucket 8 is inhibited from digging below the design surface IS, and the construction target is excavated into the desired shape.

[Computer System]

Figure 12:
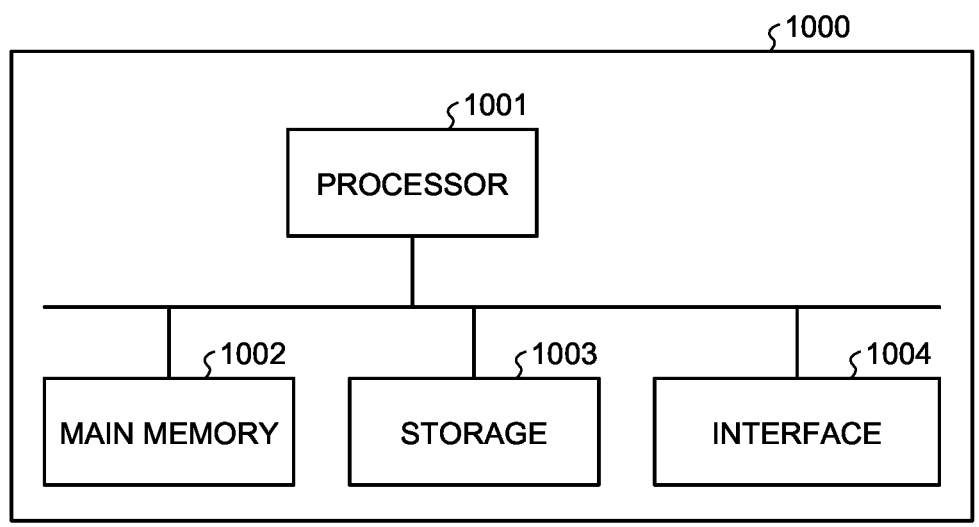
FIG. 12 is a block diagram illustrating an example of a computer system according to the present embodiment.

FIG. 12 is a block diagram illustrating an example of a computer system 1000 according to the present embodiment. The control device 50 described above includes the computer system 1000. The computer system 1000 includes a processor 1001 such as a central processing unit (CPU), a main memory 1002 that includes a nonvolatile memory such as a read only memory (ROM), and a volatile memory such as a random access memory (RAM), a storage 1003, and an interface 1004 that includes an input/output circuit. The functions of the control device 50 described above are stored, as programs, in the storage 1003. The processor 1001 reads a program from the storage 1003, loads the program in the main memory 1002, and executes the processing described above according to the program. Note that the programs may be distributed to the computer system 1000 via a network.

According to the embodiments described above, the computer system 1000 is configured to acquire the operation data of the operation device 40 operating the working equipment 1 and the swing body 2, to generate the target value of the amount of control relating to the tilt rotation of the bucket 8 and the target value of the amount of control of the swing body on the basis of the operation data obtained upon operation of the working equipment 1 and the swing body 2, and the design surface IS indicating the target shape of the construction target, to calculate the predicted value of the amount of control relating to the tilt rotation of the bucket 8 and the predicted value of the amount of control relating to the swing of the swing body 2 on the basis of the target values and the prediction model for the excavator 100, to calculate the amounts of drive to control the working equipment 1 and the swing body 2 on the basis of the predicted values and the design surface IS so as to maintain the distance from the predetermined portion of the bucket 8 to the design surface IS and the attitude of the bucket 8, and to output the control commands to control the working equipment 1 and the swing body 2 on the basis of the amounts of drive.

Other Embodiments

In the embodiments described above, the target value generation unit 55 is configured to employ the speed (translational speed and rotation speed) of the bucket 8 to generate the target value for the model predictive control unit 56. The target value generation unit 55 may employ the position and attitude of the bucket 8 to generate the target value for the model predictive control unit 56.

Note that in the embodiments described above, some or all of the functions of the control device 50 may be provided in an external computer system for the excavator 100. For example, the target value generation unit 55 and the model predictive control unit 56 may be provided in the external computer system so that the amount of drive calculated by the external computer system is transmitted to the excavator 100 via a wireless communication system.

Note that, in the embodiments described above, the construction machine 100 is the excavator. The component elements described in the above embodiments are applicable to a construction machine with working equipment, which is different from the excavator.

Note that in the embodiments described above, the swing motor 16 configured to swing the swing body 2 does not need to be the hydraulic motor. The swing motor 16 may be an electric motor configured to be driven by power supply. Furthermore, the working equipment 1 may be operated not by the hydraulic cylinder 10 but by power generated by an electric actuator such as an electric motor.

REFERENCE SIGNS LIST

1 Working Equipment
2 Swing Body
3 Traveling Body
3C Track
4 Cab
4S Seat
5 Engine
6 Boom
7 Arm
8 Bucket
9 Blade Edge
10 Hydraulic Cylinder
11 Boom Cylinder
12 Arm Cylinder
13 Bucket Cylinder
14 Tilt Cylinder
15 Rotating Cylinder
16 Swing Motor
17 Hydraulic Pump
18 Valve Device
20 Position Calculation Device
21 Position Calculator
22 Attitude Calculator
23 Orientation Calculator
30 Angle Detection Device
31 Boom Angle Detector
32 Arm Angle Detector
33 Bucket Angle Detector
34 Tilt Angle Detector
35 Rotation Angle Detector
40 Operation Device
41 Right Operating Lever
42 Left Operating Lever
43 Tilt Operating Lever
50 Control Device
51 Positional Data Acquisition Unit
52 Angle Data Acquisition Unit
53 Operation Data Acquisition Unit
54 Design Surface Acquisition Unit
55 Target Value Generation Unit
56 Model Predictive Control Unit
57 Constraint Condition Calculation Unit
58 Command Unit
60 Storage Unit
70 Design Surface Data Supply Device
100 Construction Machine
200 Control System
551 Target Translational Speed Calculation Unit
551A Translational Speed Calculation Unit
551B Speed Limit Calculation Unit
551C PI Control Unit
551D Deceleration Processing Unit
552 Target Rotation Speed Calculation Unit
552A Current Attitude Calculation Unit
552B Target Attitude Calculation Unit
552C Rotation Speed Calculation Unit
552D P Control Unit
561 Prediction Model Storage Unit
562 Prediction Unit
AX1 Boom Axis
AX2 Arm Axis
AX3 Bucket Axis
AX4 Tilt Axis
AX5 Rotating Axis

The invention claimed is:

1. A control system for a construction machine including working equipment that includes an arm and a tilt bucket, and a swing body supporting the working equipment, the control system comprising:
a processor, the processor being configured to:
acquire a design surface indicating a target shape of a construction target;
acquire operation data of an operation device operating the working equipment and the swing body;
generate a target value of an amount of control relating to tilt rotation of the tilt bucket and a target value of an amount of control of the swing body, based on the operation data obtained when the working equipment and the swing body are operated, and the operation data is further based on the design surface;
calculate a predicted value of the amount of control relating to the tilt rotation of the tilt bucket and a predicted value of an amount of control relating to swing of the swing body, based on the target values and a prediction model for the construction machine, and configured to calculate amounts of drive to control the working equipment and the swing body, based on the predicted values and the design surface so as to maintain a distance from a predetermined portion of the tilt bucket to the design surface and an attitude of the tilt bucket; and output control commands to control the working equipment and the swing body based on the amounts of drive wherein the processor outputs the control commands to control the swing body based on the amounts of drive of the swing body calculated, when the predicted value of the amount of control relating to the tilt rotation of the tilt bucket is equal to or larger than a predetermined defined value, the predicted value being calculated based on the operation data so as to maintain the distance from the predetermined portion of the tilt bucket to the design surface and the attitude of the tilt bucket.

2. The control system for the construction machine according to claim 1, wherein when the predicted value of the amount of control relating to the tilt rotation of the tilt bucket is equal to or larger than the predetermined defined value, the processor outputs the control command to control the swing body, while the tilt bucket is moved from a first position to a second position that is closer to the swing body than the first position by the operation device and the swing body is swinging.

3. The control system for the construction machine according to claim 1, wherein the amount of control relating to the tilt rotation of the tilt bucket includes a moving speed of the tilt bucket.

4. The control system for the construction machine according to claim 1, wherein the processor calculates the amounts of drive such that the predicted value of the amount of control relating to the tilt rotation of the tilt bucket follows the target value of the amount of control relating to tilt rotation of the tilt bucket.

5. The control system for the construction machine according to claim 1, wherein the processor calculates the amounts of drive so as to minimize a value of an evaluation function defined by the target value and predicted value of the amount of control relating to the tilt rotation of the tilt bucket.

6. The control system for the construction machine according to claim 5, wherein the processor calculates a first constraint condition relating to performance of the construction machine and a second constraint condition relating to a position of the tilt bucket, wherein the processor calculates the amounts of drive so as to satisfy the first constraint condition and the second constraint condition.

7. A construction machine comprising:

a swing body configured to support a working equipment; and the control system for the construction machine according to claim 1.

8. A control method for a construction machine including working equipment that includes an arm and a tilt bucket, and a swing body supporting the working equipment, the control method comprising:

acquiring operation data of an operation device operating the working equipment and the swing body;

generating a target value of an amount of control relating to tilt rotation of the tilt bucket and a target value of an amount of control of the swing body, based on the operation data obtained when the working equipment and the swing body are operated, and the operation data is further based on a design surface indicating a target shape of a construction target;

calculating a predicted value of the amount of control relating to the tilt rotation of the tilt bucket and a predicted value of an amount of control relating to swing of the swing body, based on the target values and a prediction model for the construction machine;

calculating amounts of drive to control the working equipment and the swing body, based on the predicted values and the design surface so as to maintain a distance from a predetermined portion of the tilt bucket to the design surface and an attitude of the tilt bucket; and outputting control commands to control the working equipment and the swing body based on the amounts of drive of the swing body calculated by a processor, when the predicted value of the amount of control relating to the tilt rotation of the tilt bucket is equal to or larger than a predetermined defined value, the predicted value being calculated based on the operation data so as to maintain the distance from the predetermined portion of the tilt bucket to the design surface and the attitude of the tilt bucket.

* * * * *